United States Patent
Baker et al.

(10) Patent No.: US 6,996,212 B1
(45) Date of Patent: Feb. 7, 2006

(54) VOICEMAIL SYSTEM WITH SUBSCRIBER SPECIFIC STORAGE FOLDERS

(75) Inventors: La Veria Baker, Atlanta, GA (US); David Scott, Norcross, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 61 days.

(21) Appl. No.: 10/180,261

(22) Filed: Jun. 26, 2002

(51) Int. Cl.
H04M 1/64 (2006.01)

(52) U.S. Cl. .............................. 379/88.22; 379/88.16; 379/88.19

(58) Field of Classification Search ............. 379/67.1, 379/88.11, 88.12, 88.17, 88.22, 88.16, 88.18, 379/88.19
See application file for complete search history.

(56) References Cited

U.S. PATENT DOCUMENTS

| | | | |
|---|---|---|---|
| 5,479,491 A | 12/1995 | Herrero Garcia et al. ...... | 379/88 |
| 5,742,905 A | 4/1998 | Pepe et al. ................... | 455/461 |
| 5,748,709 A | 5/1998 | Sheerin .................... | 379/88.22 |
| 5,797,124 A | 8/1998 | Walsh et al. ................ | 704/275 |
| 5,884,262 A | 3/1999 | Wise et al. .............. | 704/270.1 |
| 5,892,814 A * | 4/1999 | Brisebois et al. ........ | 379/88.24 |
| 5,963,626 A | 10/1999 | Nabkel ........................ | 379/142 |
| 6,049,796 A | 4/2000 | Siitonen et al. ................ | 707/3 |
| 6,078,650 A * | 6/2000 | Hansen ......................... | 379/52 |
| 6,097,941 A | 8/2000 | Helferich ................. | 455/412.1 |
| 6,122,348 A | 9/2000 | French-St. George et al. ........................ | 379/88.23 |
| 6,125,376 A | 9/2000 | Klarlund et al. ............ | 715/513 |
| 6,181,780 B1 | 1/2001 | Finnigan .................... | 379/67.1 |
| 6,181,781 B1 | 1/2001 | Porter et al. ............. | 379/88.17 |
| 6,226,362 B1 | 5/2001 | Gerszberg et al. ....... | 379/88.13 |
| 6,233,318 B1 | 5/2001 | Picard et al. ............ | 379/88.17 |
| 6,285,984 B1 | 9/2001 | Speicher ...................... | 705/14 |
| 6,292,480 B1 | 9/2001 | May ........................... | 370/352 |
| 6,301,608 B1 * | 10/2001 | Rochkind ................ | 379/93.24 |
| 6,332,020 B1 | 12/2001 | Mitchell et al. ......... | 379/93.25 |
| 6,368,205 B1 | 4/2002 | Frank ........................ | 453/413 |
| 6,374,223 B1 | 4/2002 | Donaldson et al. ......... | 704/260 |
| 6,446,114 B1 | 9/2002 | Bulfer et al. ............... | 709/206 |
| 6,459,774 B1 | 10/2002 | Ball et al. .................. | 379/67.1 |
| 6,459,785 B1 | 10/2002 | Naumburger .......... | 379/214.01 |

(Continued)

FOREIGN PATENT DOCUMENTS

EP 1 051 018 A2 8/2000

OTHER PUBLICATIONS

U.S. Appl. No. 10/028,618, filed Dec. 20, 2001, entitled "Delivery of Wireless Messages to Wireline Interactive Devices", Inventors: Simpson.

(Continued)

*Primary Examiner*—Ovidio Escalante
(74) *Attorney, Agent, or Firm*—Merchant & Gould (57) ABSTRACT

A method and system are provided for creating and utilizing subscriber specific memory locations or storage folders for storing incoming voicemail messages in a telecommunications system voicemail system. A subscriber to voicemail services creates subscriber or user-specific memory locations or storage folders to which callers may direct a voice message. When a caller calls the subscriber's directory number and is forwarded to the subscriber's voicemail service, the caller is given the option to save the message in one of a number of previous created voice message folders. For example, the caller may receive a prompt like "Press 1 to leave a message for Jane." If messages are inadvertently left in the wrong voice message folder, the user having authorized access to that folder may move the message to the appropriate folder. If desired, personal identification numbers (PIN) may be assigned to each voice message folder to control access to messages saved therein.

18 Claims, 4 Drawing Sheets

U.S. PATENT DOCUMENTS

| | | | |
|---|---|---|---|
| 6,487,277 B2 * | 11/2002 | Beyda et al. | 379/88.01 |
| 6,519,327 B1 | 2/2003 | Cannon et al. | 379/88.22 |
| 6,621,892 B1 | 9/2003 | Banister et al. | 379/88.14 |
| 6,683,940 B2 | 1/2004 | Contractor | 379/88.17 |
| 6,697,459 B2 | 2/2004 | Finnigan | 379/88.18 |
| 6,721,397 B1 | 4/2004 | Lu | 379/88.11 |
| 6,744,867 B1 | 6/2004 | Chin et al. | 379/142.01 |
| 6,795,530 B1 | 9/2004 | Gilbert et al. | 379/76 |
| 6,807,257 B1 | 10/2004 | Kurganov | 379/88.22 |
| 6,888,930 B1 | 5/2005 | Hartselle et al. | 379/88.22 |
| 2002/0031207 A1 | 3/2002 | Lin | 379/88.17 |
| 2002/0069060 A1 | 6/2002 | Cannavo et al. | 704/257 |
| 2002/0077082 A1 | 6/2002 | Cruickshank | 455/413 |
| 2002/0131566 A1 | 9/2002 | Stark et al. | 379/88.19 |
| 2002/0143885 A1 * | 10/2002 | Ross, Jr. | 709/207 |
| 2002/0147592 A1 * | 10/2002 | Wilmot et al. | 704/270.1 |
| 2002/0159572 A1 | 10/2002 | Fostick | 379/88.14 |
| 2003/0018720 A1 | 1/2003 | Chang et al. | 709/206 |
| 2003/0039342 A1 | 2/2003 | Yafuso | 379/88.19 |
| 2003/0078035 A1 | 4/2003 | Sheha et al. | 455/414.1 |
| 2003/0119486 A1 | 6/2003 | Tari et al. | 455/412 |
| 2003/0135647 A1 | 7/2003 | Himmel et al. | 709/245 |
| 2003/0140090 A1 | 7/2003 | Rezvani et al. | 709/203 |
| 2003/0140091 A1 | 7/2003 | Himmel et al. | 709/203 |
| 2003/0142799 A1 * | 7/2003 | Candell et al. | 379/88.13 |

OTHER PUBLICATIONS

U.S. Appl. No. 10/178,276, filed Jun. 24, 2002, entitled "Saving and Forwarding Customized Messages", Inventors: Roberts et al.

U.S. Appl. No. 10/022,941, filed Dec. 17, 2001, entitled "Method and System for Call, Facsimile and Electronic Message Forwarding", Inventors: Moore et al.

U.S. Appl. No. 10/109,975, filed Mar. 29, 2002, entitled "Transferring Voice Mail Messages in Text Format", Inventors: Eason.

U.S. Appl. No. 10/112,663, filed Mar. 29, 2002, entitled "Saving Information from Information Retrieval Systems", Inventors: Hartselle et al.

U.S. Appl. No. 10/180,149, filed Jun. 26, 2002, entitled "Categorization of Messages Saved on a Network-Based Voicemail System", Inventors: Baker et al.

U.S. Appl. No. 10/184,193, filed Jun. 27, 2002, entitled "Storage of Voicemail Messages at an Alternate Storage Location", Inventors: Baker et al.

U.S. Appl. No. 10/180,167, filed Jun. 26, 2002, entitled "Voicemail Box with Caller-Specific Storage Folders", Inventors: Baker et al.

U.S. Official Action dated Jan. 24, 2005 in U.S. Appl. No. 10/022,941.

U.S. Official Action dated May 4, 2005 issued in connection with U.S. Appl. No. 10/184,193.

U.S. Official Action dated May 18, 2005 issued in connection with U.S. Appl. No. 10/178,276.

U.S. Official Action dated May 3, 2005 issued in connection with U.S. Appl. No. 10/109,975.

Office Action issued on U.S. Appl. No. 10/178,276 filed Oct. 1, 2004.

Office Action issued on U.S. Appl. No. 10/109,975 filed Aug. 25, 2004.

U.S. Official Action dated Jul. 14, 2005 in U.S. Appl. No. 10/180,167.

U.S. Official Action dated Aug. 25, 2005 in U.S. Appl. No. 10/178,276.

U.S. Official Action dated Oct. 4, 2005 in U.S. Appl. No. 10/028,618.

U.S. Official Action dated Nov. 4, 2005 in U.S. Appl. No. 10/184,193.

* cited by examiner

VOICEMAIL SYSTEM WITH SUBSCRIBER SPECIFIC STORAGE FOLDERS

FIELD OF THE INVENTION

This invention relates to method and system for creating and using subscriber specific storage folders within a voicemail system.

BACKGROUND

In a typical voicemail system, calling parties attempt to reach a called party or a subscriber of the functionality of the voicemail system and are directed to the subscriber's voicemail box where a voice message may be left for the subscriber's subsequent review and use. Often, a number of voicemail system users have access to a single voicemail box to which all voicemail messages are left to all users of that voicemail box. For example, one voicemail box may be associated with a single telephone directory number to which all members of a family or multiple roommates in an apartment or dormitory receive voicemail messages. If a voicemail message is left for one member of the family, but the message is opened and reviewed by another member of the family, the intended recipient of the message may not receive the message or know that the message was left, and any privacy considerations associated with the message are lost because the message is accessible by others who have access to the single voicemail box.

Accordingly, there is a need for a method and system for providing called party-specific folders within a single voicemail box to which voice messages from specific callers may be directed for subsequent review only by the intended recipient of those voice messages. It is with respect to these and other considerations that the present invention has been made.

SUMMARY OF INVENTION

Embodiments of the present invention are directed toward a method and system for providing subscriber specific memory locations or storage folders for storing incoming voicemail messages in a telecommunications system voicemail system. A subscriber to voicemail services creates subscriber or user-specific memory locations or storage folders to which callers may direct a voice message. When a caller calls the subscriber's directory number and is forwarded to the subscriber's voicemail service, the caller is given the option to save the message in one of the number of previous created voice message folders. For example, the caller may receive a prompt like "Press 1 to leave a message for Jane." If messages are inadvertently left in the wrong voice message folder, the user having authorized access to that folder may move the message to the appropriate folder. If desired, personal identification numbers (PIN) may be assigned to each voice message folder to control access to messages saved therein.

These and other features and advantages, which characterized the present invention, will be apparent from a reading from the following detailed description and a review of the associated drawings. It is to be understood that both the foregoing general description and the following detail description are exemplary and explanatory only and are not restricted of the invention as claimed.

DETAILED DESCRIPTION

The following description of an embodiment of the present invention is made with reference to the above-described drawings where enlighten numerals refer to like parts or components throughout the several figures. The present invention is directed to a method and system for creating and utilizing subscriber or user-specific voice message storage folders within a voicemail box of a voicemail system.

Operating Environment

Figure 1:
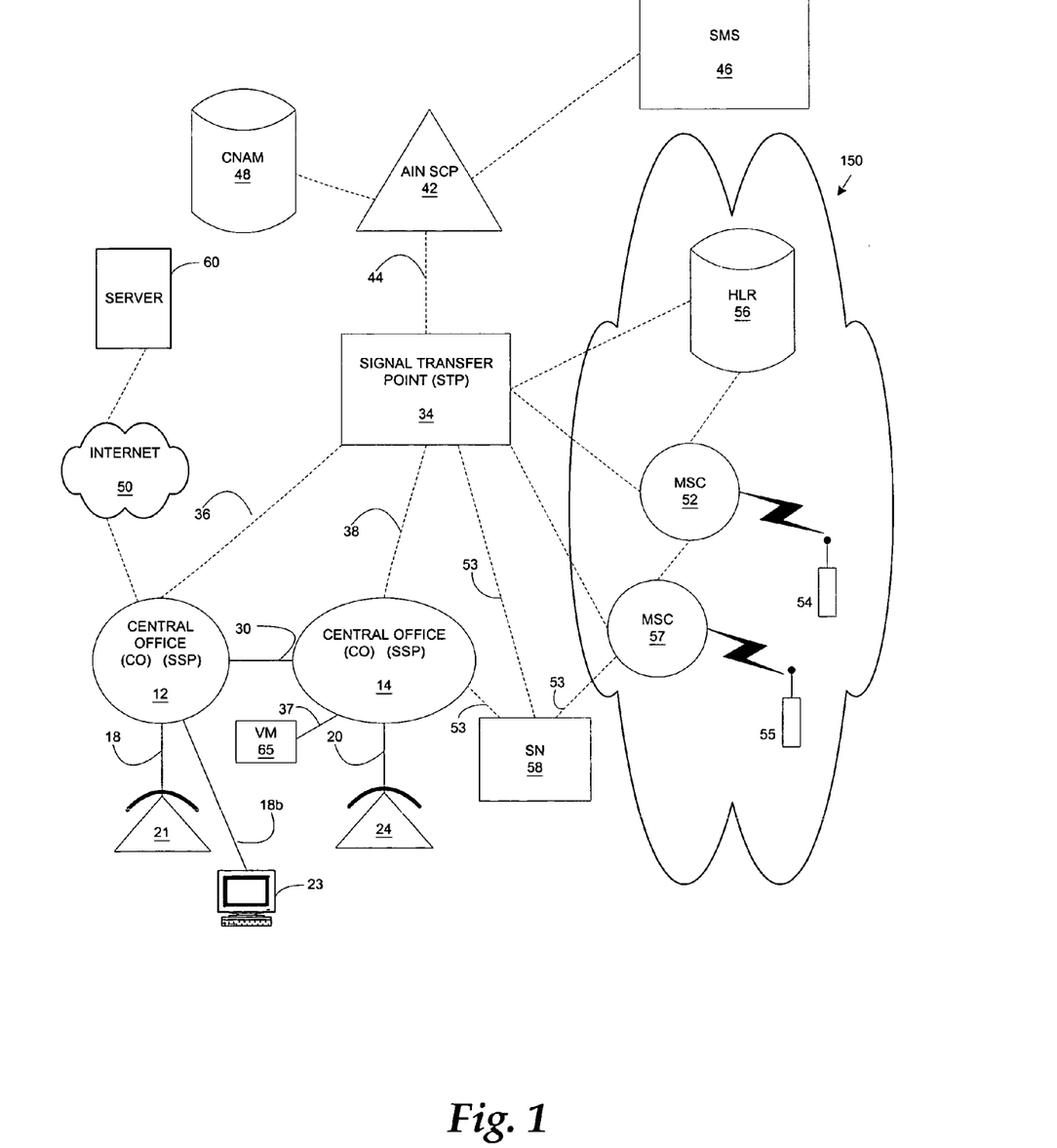
FIG. 1 is a simplified block diagram illustrating components of a wireline and wireless telecommunication network that provides an operating environment for the present invention.

FIG. 1 is a block diagram illustrating components of a wireline and wireless telephone network that provides an exemplary operating environment for the present invention. The public switched telephone network that evolved in the 1980s incorporated the advanced intelligent network (AIN). Some of the components of the advanced intelligent network are illustrated in FIG. 1. FIG. 1 is illustrative of at least a part of the advanced intelligent network (AIN) 100 of a typical local exchange carrier integrated with components of a wireless network 150. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices are provided in a typical public switched telephone network. As shown in FIG. 1, each central office may include an electronic switch known to those skilled in the art as a service switching point (SSP). These are indicated in FIG. 1 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as the trunk circuit 30.

As shown in FIG. 1, switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. A computer 23 also is illustrated as connected to the switch 12 via the subscriber line 18(*b*). The computer 23 is illustrative of a single or a plurality of computing and data storage devices. SSP switches 12 and 14 are connected by a plurality of trunk circuits 30. These are the voice path trunks that interconnect the central offices 12 and 14 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local service control point (SCP) 42 that is connected to signal transfer point 34 via SS7 data link 44. As is known to those skilled in the art, service control points, such as the SCP 42, are physically implemented by relatively powerful fault tolerant computers. Among the functions performed by the service control points is maintenance of network databases used in providing enhanced services. Service control points, such as SCP 42, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

Additional devices for implementing advanced network functions within the AIN 100 are provided by regional STPs (not shown) and regional SCPs (not shown). The STP 34 is connected to the SSPs via connections 36, 38 and 40. Both the regional SCPs and the local SCP 42, which represent a plurality of local SCPs distributed throughout the AIN 100, are connected via respective data links to the SMS 46. The SMS 46 provides a centralized platform for remotely programming the various SCPs of the AIN 100 so that a coordinated information processing scheme may be implemented for the AIN 100.

The modern Advanced Intelligent Network 100 also includes service nodes (SN) such as the service node 58. Those skilled in the art are familiar with service nodes, which are physically implemented by the same types of computers that embody the SCP 42. In addition to the computing capability and data base maintenance features, service nodes 58 use ISDN lines and may include DTMF signal recognition devices, tone generation devices, text to speech (TTS) voice synthesis devices and other voice or data resources. As shown in FIG. 1, the connection is through the SSP. For example, SN 55 is connected to SCP 42 via ISDN links 53 to SSP 12, ISDN/SS7 protocol conversion in SSP 12, and SS7 links 38 and 44. According to a preferred embodiment, the ISDN links 53 serve as a primary rate interface (PRI) over which services may be provided to subscribers using wireline services such as the wireline telephone sets 21 and 24 and subscribers using wireless services such as the wireless units 54, 55, 60, and 62.

The voicemail system 65 is shown in FIG. 1 being functionally connected to the switch 14 and is a component of the network 100. That is, calls are routed to and from the voicemail system 65 at the control and direction of the network 100 via such components as the SCP 42. The voicemail system 65 may be connected to the switch 14 via a PRI interface line 37 similar to the connection of the service node 58 to the switch 14. In operation, the voicemail system 65 is treated like a switch 14 whereby calls directed to voicemail boxes maintained at the voicemail system 65 are directed to the voicemail system 65 as calls are directed to customer premises equipment, such as telephones, via switches 12, 14.

The voicemail system 65 typically includes a computer or collection of computers, recording and recording playback devices, and software for recording announcements for incoming calls, recording and playing back recorded messages, and for receiving incoming calls and for making outgoing calls at the direction of the network 100. In addition to the recording and playback functionality, the voicemail system 65 includes text-to-speech (TTS) and speech-to-text (STT) synthesis devices and software for conversion of analog voice messages to digitized forms such as WAV files and MP3 files. The voicemail system 65 has memory capacity for saving announcements to incoming callers and for saving messages from incoming callers. The computing system of the voicemail system 65 also includes an electronic mail server that may send and receive electronic mail via the network 100 and the Internet 50.

The Internet 50 is well known to those skilled in the art as essentially a packet-switched network based on the family of protocols called Transmission Control Protocol/Internet Protocol (TCP/IP), a family of networking protocols providing communication across interconnected networks between computers with diverse hardware architectures and between various computer operating systems. Operation of the Internet 50 and the TCP/IP transmission protocols is well known to those skilled in the art.

The server 60 is illustrative of a computing system accessible via a distributed computing environment such as the Internet 50. The server 60 may include a computer or collection of computers along with associated software applications and memory capacity. The server 60 may serve as an Internet web server for maintaining and administering Internet web pages serving as an access point to the functionality of the present invention via the computer 23. For example, a user may use the computer 23 to access the functionality of the present invention by accessing an Internet web page maintained at the server 60 and operated by the provider of the functionality.

The wireless network 150, such as a cellular network, comprises a mobile switching center (MSC) 52. The MSC 52 is a switch providing services and coordination between wireless users in the network 150 and external networks. The MSC 52 may be connected to the STP 34 to provide information to the wireline network 100 and receive information from the wireline network. The MSC 52 also communicates with a wireless subscriber, such as wireless telephones 54 and 55. The wireless telephones 54 and 55 are also illustrative of other wireless computing devices, such as pagers and personal digital assistants.

In operation, the intelligent network elements of the AIN 100, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP switches 12 and 14, a relatively small set of triggers are defined at the SSP switches for each call.

The message created by an SSP in response to the "firing" of a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well known to those skilled in the art and will not be further described herein. For more information regarding the AIN protocol, see Bellcore Specification GR-1298-CORE Switching Systems Generic Requirements for AIN 0.1, which is incorporated herein by reference.

Operation

Figure 2:
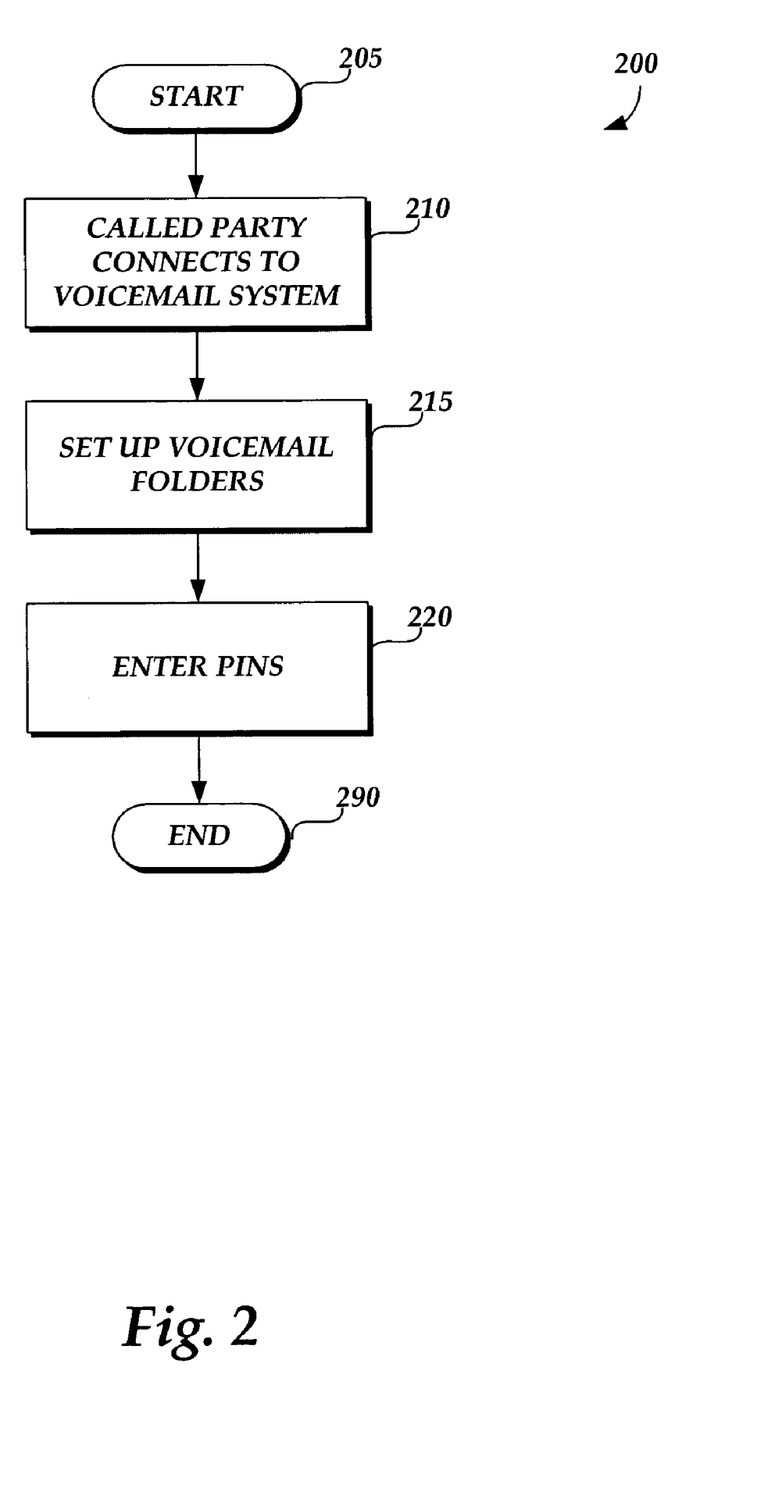
FIG. 2 illustrates a logical flow of the steps preformed by a method and system of the present invention for creating subscriber or user-specific voice message folders within a single voicemail box of a voicemail system according to an embodiment of the present invention.

Having described an operating environment for the present invention with reference to FIG. 1, FIG. 2 illustrates a logical flow of the steps preformed by a method and system of the present invention for creating subscriber or user-specific voice message folders within a single voicemail box of a voicemail system according to an embodiment of the present invention. The method 200 begins at start step 205 and proceeds to step 210 where the subscriber or user of voicemail services connects to the voicemail system 65 in order to create user-specific voice message folders in which incoming callers may save voice messages directed to a particular users.

In a typical setting, all the members of a family, or multiple roommates in an apartment may have access to a single voicemail box supplied by the voicemail system 65. That is, all incoming voice messages are left to a single voicemail box, and each member of the house or each user of the voicemail system has access to that same voicemail box. If one user enters the voicemail box and listens to all messages contained therein, that user may necessarily hear voice messages intended for a different user, and consequently, the intended recipient of some of the voice messages may not receive those voice messages, and privacy considerations associated with voice messages intended for a different user may be lost.

At step 210, the subscriber to voicemail services from the voicemail system 65 or a particular user may call into the voicemail system 65 in order to set up a user-specific folder so that incoming callers directed to the voicemail system 65 may select the appropriate user-specific voice message folder in which to leave a message. At step 210, the user dials into the voicemail system 65 in the normal manner in which the user dials into the voicemail system 65 to listen to voicemail messages contained therein. At step 215, a series of prompts may be provided to the user to assist the user in setting up the user-specific voice message folder. For example, a prompt may be provided to the user such as "If you would like to set up a user-specific voice message folder for your voicemail box, press 5." If the user responds affirmatively, a follow-up prompt may be provided to the user to request that the user provide a name for the user-specific voice message folder, such as the user's first name. Additionally, at step 220, the voicemail system 65 may prompt the user for a personal identification number (PIN) so that the user may control access to her personalized voice message folder.

According to an alternate embodiment, the subscriber or user may create the user's specific voice message folder via an Internet-based website operated by the telecommunications service provider operating the voicemail system 65. Referring back to FIG. 1, the subscriber or user may open an Internet-based web page at her computer 23 from the server 60 via the Internet 50. Once the user opens the Internet-based web page of the voicemail system provider, the user may select the opening of a user-specific voice message folder, and the user may enter a name for the folder and a personal identification number to control access to the folder. If the user enters a text-based name for the folder, the text-based name may be converted to speech at a text-to-speech voice synthesizer device at the voicemail system 65 for presentation of an audible version of the folder name to calling parties. In either case, the name associated with the user-specific voice message folder may also be in the form of a numeric identifier such as "1, 2, 3."

Once the user-specific voice message folder has been established as described with reference to FIG. 2, incoming callers who are directed to the voicemail system 65 of the subscriber will be offered a list of user-specific voice message folders to choose from. Additionally, as should be understood by those skilled in the art, if an incoming caller does not wish to leave a message in any of the user-specific voice message folders, an incoming caller will be offered the option of saving a message to the general voice message folder to which each authorized user may gain access.

Figure 3:
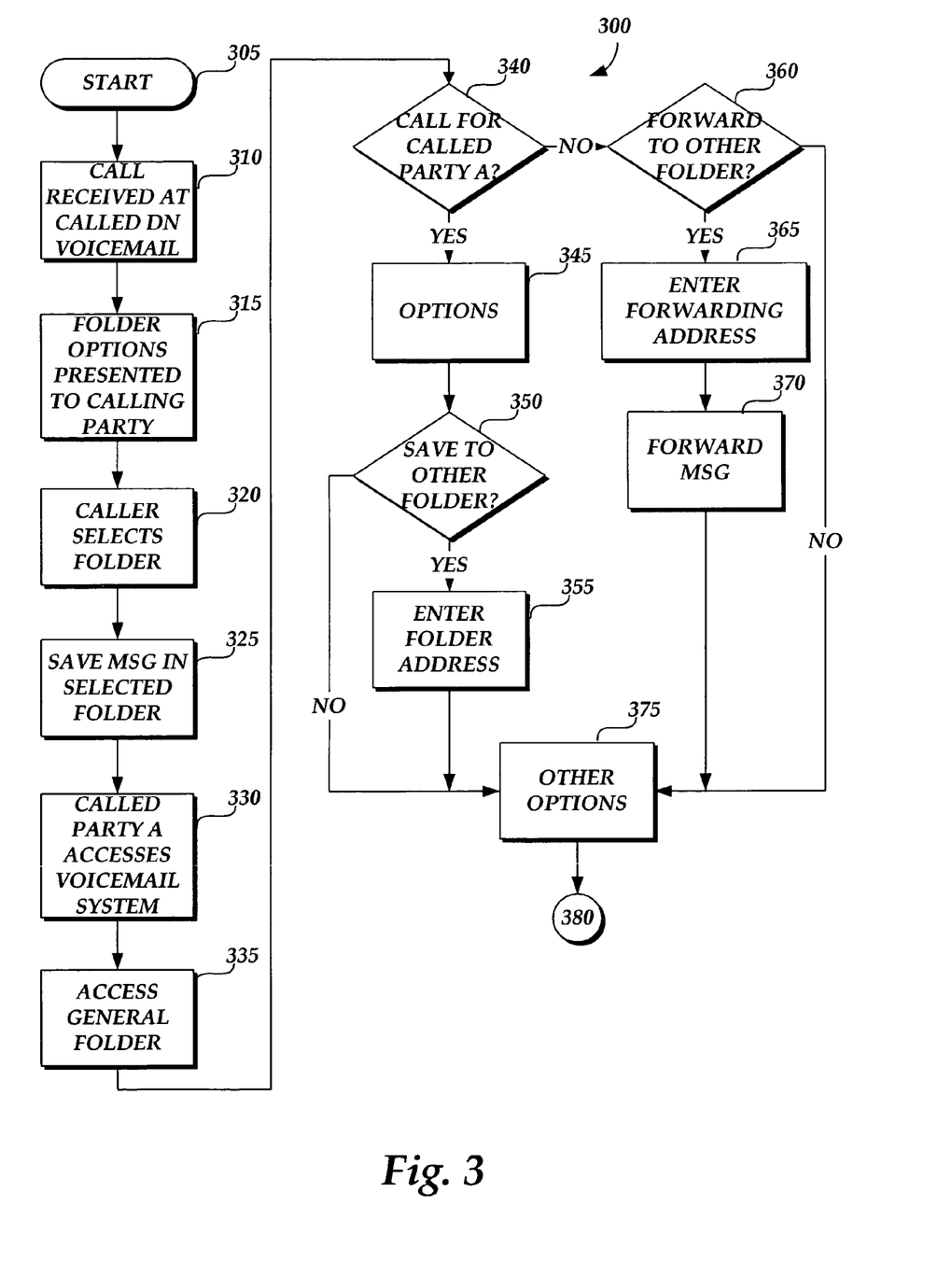
FIGS. 3 and 4 illustrate a logical flow of the steps preformed by a method and system of the present invention for saving voice messages to subscriber or user-specific voice message folders within a single voicemail box of a voicemail system according to an embodiment of the present invention.
Figure 4:
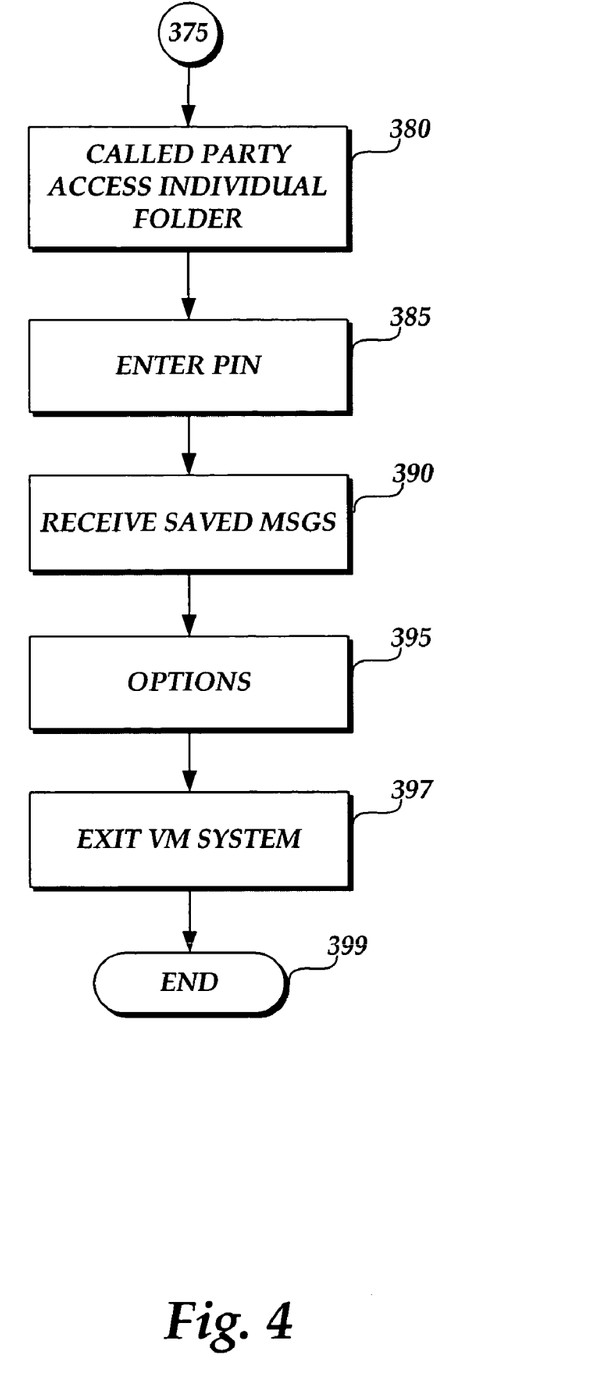

FIGS. 3 and 4 illustrate a logical flow of the steps preformed by a method and system of the present invention for saving voice messages to subscriber or user-specific voice message folders within a single voicemail box of a voicemail system according to an embodiment of the present invention. The method 300 begins at start step 305 and proceeds to step 310 where an incoming call is placed to the directory number of a subscriber to the voicemail services according to an embodiment of the present invention. The incoming call is received at the subscriber or calling party's switch 12, and a determination is made as to whether the incoming call will be answered, or whether the incoming call should be forwarded to the voicemail system 65. The call will be forwarded to the voicemail system 65 if the subscriber's line 18 is busy, or if an indication of an unanswered call is received, such as the presentation of more than requisite number of rings associated with the subscriber's line 18.

At step 315, the incoming call is forwarded to the voicemail system 65 so that the caller may leave a voicemail message for the subscriber or user of the voicemail services of the voicemail system 65. At step 315, an announcement is played from the voicemail system 65 to the incoming caller that provides the incoming caller with a list of named user-specific voice message folders from which the incoming caller may choose for leaving a voice message. As described above, if the caller does not wish to leave a voicemail message to any of the listed user-specific voice message folders, the caller may leave a voicemail message to the general voice message folder to which all authorized users of the voicemail box may gain access. At step 315, the voicemail system 65 may present a prompt to the caller such as "To leave a message for Jane, press 1; to leave a message for Bob, press 2; to leave a general voicemail message, press 3."

At step 320, the caller selects one of the voice message folder options such as option 1 for leaving a message for "Jane." At step 325, the caller leaves a message in the user-specific voice message folder selected at step 320. As should be understood, when a user creates a user-specific voice message folder, as described with reference to FIG. 2, the user may also enter a personalized greeting that will be heard by incoming callers once the caller selects the user-specific voice message folder. For example, the user may enter a personalized greeting such as "I'm not in right now, please leave a message after the tone."

At step 335, the user of voicemail system 65 enters the voicemail system 65 and accesses the general voice message folder to which all authorized users may gain access. At step 340, the user selects a first message for review, and a determination is made as to whether the first message selected by the user was intended for the user. If not, the method proceeds to step 360, and a determination is made as to whether the user would like to move the reviewed message to a user-specific voice message folder of a separate user for which the voice message was intended. If not, the method proceeds to step 375, and the user is provided with other options including saving the message, deleting the message, skipping the message, and the like. If the first user would like to move the reviewed message to a second user's voice message folder, the method proceeds to step 365, and the user enters an address for the second user's voice message folder. It should be understood, if the first user knows an alpha-numeric identification for the second user's voice message folder, such as folder "1234," the first user may enter that number for the reviewed message. If not, the first user may be provided with a list of voice message folders for moving the reviewed message. For example, the voice message system 65 may provide the first user with a prompt such as "To move a message to a different user folder, please select from the following list of user folders: press 1 for Jane; press 2 for Bob." After the first user selects an address to move the reviewed message to a second user's voice message folder, the method proceeds to step 370 and the message is moved to the second user's voice message folder.

Referring back to step 340, if the message reviewed by the first user was directed to the first user, the method then proceeds to step 345, and the first user is provided with options including saving the reviewed message to her user-specific voice message folder, to a second user's voice message folder, or saving the message to the general voice message folder. At step 350, the determination is made as to whether the first user would like to save the message to another voice message folder. If so, the method proceeds to step 355, and the first user enters the address of her user-specific voice message folder or the address of a second user's voice message folder, as described above. Alternatively, as described above, the user may enter an alpha-numeric identification for her folder or a different user's folder to which she would like to save the reviewed voice message. That is, the user may know an alpha-numeric identification for a desired folder, such as folder "1234." The method proceeds to step 375, and other options including turning to the general voice message folder, deleting a message, skipping a message, and the like are presented to the first user.

At step 380, a called party such as one of the users authorized to receive messages from the subscriber's voicemail box accesses the voicemail system 65 to obtain voice messages left during the called party's absence. If the called party or user wishes to access messages left to her user-specific voice message folder, the user may select her user-specific voice message folder from a list of user-specific folders either by name or by alpha-numeric identification. The user may then enter her personal identification number (PIN), at step 385, in response to a prompt from the voicemail system 65 in order to gain access to the selected folder. According to one embodiment, after the user selects a given user-specific voice message folder, the voicemail system may provide the user information including the number of messages saved in the folder and/or the number saved in the folder that have or have not been reviewed. Once the user gains access to her user-specific voice message folder at step 390, she may listen to messages left in her folder during her absence. After the user has listened to the desired messages saved in her user-specific voice message folder, the method proceeds to step 395, and the voicemail system 65 provides the user with other options including the options to save messages, delete messages, skip messages, and the like. At step 397, the user may exit the voicemail system, and the method ends at step 399.

As described herein, a method and system are provided for creating and utilizing subscriber or user-specific voice message folders in a voicemail box of a voicemail system to which incoming callers may direct voice messages. It will be apparent to those skilled in the art that various modifications and variations may be made in the present invention without departing from the scope or sphere of the invention. Other embodiments of the invention will be apparent to those skilled in the art from consideration of the specification and practice of the invention disclosed herein.

We claim:

1. A method of saving voicemail messages to calling party selectable voice message folders, comprising:

creating, at a voicemail system, a plurality of voice message folders and a general voice message folder for storing voice messages from calling parties, wherein the plurality of voice message folders and the general voice message folder are associated with a voicemail box;

associating each of the plurality of voice message folders with a particular called party;

receiving a call from a calling party at the voicemail system directed to a called party;

at the voicemail system, providing the calling party a list of the plurality of voice message folders from which to choose a specific voice message folder in which to save a voice message to the called party;

selecting, by the calling party, the specific voice message folder from the list of the plurality of voice message folders in which to save a voice message to the called party;

saving the voice message to the called party in the selected specific voice message folder;

receiving a personal identification number (PIN) from the called party to obtain access to the voice message folder for retrieving the voice message saved therein; and moving, by the called party, a voice message retrieved from the general voice message folder to one of the plurality of voice message folders.

2. The method of claim 1, prior to creating, at a voicemail system, a plurality of voice message folders, further comprising contacting telephonically the voicemail system.

3. The method of claim 1, prior to creating at a voicemail system, a plurality of voice message folders, further comprising contacting the voicemail system via an Internet-based web page for accessing the voicemail system.

4. The method of claim 1, further comprising entering an identification for each of the plurality of voice message folders.

5. The method of claim 4, wherein entering an identification for each of the plurality of voice message folders includes entering a name associated with a called party associated with each of the plurality of voice message folders.

6. The method of claim 4, wherein entering an identification for each of the plurality of voice message folders includes entering an alpha-numeric identification associated with a called party associated with each of the plurality of voice message folders.

7. The method of claim 4, further comprising saving each of the plurality of voice message folders and associated identifications at the voicemail system.

8. The method of claim 1, further comprising associating a PIN with each of the plurality of voice message folders for accessing each of the plurality of voice message folders.

9. The method of claim 1, further comprising if the calling party does not select a specific voice message folder from the list of the plurality of voice message folders, saving the voice message to the called party in the general voice message folder.

10. The method of claim 1, further comprising accessing, by a called party, the general voice message folder to retrieve a voice message saved therein.

11. The method of claim 1, prior to moving the voice message retrieved from the general voice message folder to one of the plurality of voice message folders, further comprising:
   obtaining, by the called party, a list of the plurality of voice message folders;
   selecting, by the called party, one of the plurality of voice message folders; and
   moving the voice message retrieved from the general voice message folder to the voice message folder selected by the called party.

12. The method of claim 1, further comprising accessing, by a called party, one of the voice message folders to retrieve a voice message saved therein.

13. The method of claim 12, after accessing, by a called party, one of the voice message folders to retrieve a voice message saved therein, further comprising providing the called party an indication that one or more voice messages are saved in the voice message folder.

14. The method of claim 13, wherein providing the called party an indication that one or more voice messages are saved in the voice message folder, further comprises providing the called party an audio message informing the called party of the presence of one or more messages saved in the voice message folder.

15. The method of claim 12, further comprising if the retrieved voice message should be moved to a different voice message folder, moving the retrieved voice message to one of the plurality of voice message folders.

16. The method of claim 15, prior to moving the retrieved voice message to one of the plurality of voice message folders, further comprising:
   obtaining, by the called party, a list of the plurality of voice message folders;
   selecting, by the called party, one of the plurality of voice message folders; and
   moving the retrieved voice message to the selected voice message folder.

17. A system for saving voicemail messages to calling party selectable voice message folders, comprising:
   means for creating a plurality of voice message folders and a general voice message folder for storing voice messages from calling parties, wherein the plurality of voice message folders and the general voice message folder are associated with a voicemail box;
   means for associating each of the plurality of voice message folders with a particular called party;
   means for receiving a call from a calling party at the voicemail system directed to a called party;
   means for providing the calling party a list of the plurality of voice message folders from which to choose a specific voice message folder in which to save a voice message to the called party;
   means for receiving a selection by the calling party of the specific voice message folder from the list of the plurality of voice message folders in which to save a voice message to the called party;
   means for saving the voice message to the called party in the selected specific voice message folder;
   means for receiving a personal identification number (PIN) from the called party to obtain access to the voice message folder for retrieving the voice message saved therein; and
   means for moving, by the called party, a voice message retrieved from the general voice message folder to one of the plurality of voice message folders.

18. The system of claim 17, further comprising:
   means for providing the called party a list of the plurality of voice message folders;
   means for receiving a selection by the called party of one of the plurality of voice message folders; and
   means for moving a voice message retrieved from a general voice message folder to the voice message folder selected by the called party.

\* \* \* \* \*